United States Patent
Rusert et al.

(10) Patent No.: US 9,143,783 B2
(45) Date of Patent: Sep. 22, 2015

(54) INDICATING BIT STREAM SUBSETS

(75) Inventors: Thomas Rusert, Kista (SE); Rickard Sjöberg, Stockholm (SE); Zhuangfei Wu, Danderyd (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/979,797

(22) PCT Filed: Jan. 19, 2012

(86) PCT No.: PCT/SE2012/050040
§ 371 (c)(1),
(2), (4) Date: Jul. 15, 2013

(87) PCT Pub. No.: WO2012/099529
PCT Pub. Date: Jul. 26, 2012

(65) Prior Publication Data
US 2013/0287123 A1    Oct. 31, 2013

Related U.S. Application Data

(60) Provisional application No. 61/434,146, filed on Jan. 19, 2011.

(51) Int. Cl.
*H04N 7/32* (2006.01)
*H04N 19/597* (2014.01)
(Continued)

(52) U.S. Cl.
CPC .... *H04N 19/00769* (2013.01); *G06F 17/30516* (2013.01); *H04N 19/597* (2014.11);
(Continued)

(58) Field of Classification Search
CPC ................... G06F 17/30516; G06F 17/30424; G06F 17/30442; G06F 17/30477; G06F 17/30551
USPC ............................................ 375/240.26, 240
See application file for complete search history.

(56) References Cited

U.S. PATENT DOCUMENTS 5,874,997 A * 2/1999 Haigh ..................... 375/240.25
6,201,834 B1 * 3/2001 Zhu ......................... 375/240.27
(Continued)

FOREIGN PATENT DOCUMENTS

WO      0001153 A1     1/2000
WO    2007080223 A1    7/2007
(Continued)

OTHER PUBLICATIONS

Author Unknown, "Information technology—Coding of audio-visual objects—Part 12: ISO base media file format," International Standard; ISO/IEC; 14496-12; 2008; pp. i-x, 1-109. Third Edition.
(Continued)

*Primary Examiner* — Dave Czekaj
*Assistant Examiner* — Berteau Joisil
(74) *Attorney, Agent, or Firm* — Murphy, Bilak & Homiller, PLLC

(57) ABSTRACT

A method of indicating bit stream subsets in a video bit stream (210) is provided. The method comprises receiving the bit stream, dividing the bit stream into video packets (211-216), wherein each packet comprises either one of video data or supplemental information, and marking each packet with a single subset identifier (stream_id). Each subset identifier is associated with a corresponding bit stream subset (221-223). Further, a method of extracting video packets from a video bit stream is provided. The method comprises providing relevant subset identifiers, receiving video packets from the bit stream, and, for each received packet, inspecting the subset identifier of the packet. The packet is extracted if the subset identifier matches one of the relevant subset identifiers. This allows condensing properties of a bit stream subset into a single identifier, thereby simplifying the processing of video packets in the network and on the client side. Further, devices corresponding to the aforementioned methods are provided.

26 Claims, 4 Drawing Sheets

(51) Int. Cl.

| | |
|---|---|
| *G06F 17/30* | (2006.01) |
| *H04N 21/2343* | (2011.01) |
| *H04N 21/235* | (2011.01) |
| *H04N 21/236* | (2011.01) |
| *H04N 21/434* | (2011.01) |
| *H04N 21/4402* | (2011.01) |
| *H04N 21/845* | (2011.01) |
| *H04N 19/70* | (2014.01) |

(52) U.S. Cl.
CPC ............ *H04N 19/70* (2014.11); *H04N 21/235* (2013.01); *H04N 21/236* (2013.01); *H04N 21/2343* (2013.01); *H04N 21/434* (2013.01); *H04N 21/4402* (2013.01); *H04N 21/8451* (2013.01)

(56) References Cited

U.S. PATENT DOCUMENTS

| | | | | |
|---|---|---|---|---|
| 7,486,680 | B1* | 2/2009 | Zhang et al. | 370/395.4 |
| 7,603,024 | B1* | 10/2009 | Chun | 386/248 |
| 2006/0146734 | A1* | 7/2006 | Wenger et al. | 370/260 |
| 2006/0203713 | A1 | 9/2006 | Laroia et al. | |
| 2007/0025441 | A1* | 2/2007 | Ugur et al. | 375/240.03 |
| 2008/0068446 | A1* | 3/2008 | Barkley et al. | 348/14.07 |
| 2010/0111183 | A1 | 5/2010 | Jeon et al. | |
| 2011/0064146 | A1 | 3/2011 | Chen et al. | |
| 2011/0221861 | A1 | 9/2011 | Jeon et al. | |

FOREIGN PATENT DOCUMENTS

| | | |
|---|---|---|
| WO | 2008030067 A1 | 3/2008 |
| WO | 2010126608 A2 | 11/2010 |

OTHER PUBLICATIONS

Author Unknown, "Information technology—Coding of audio-visual objects—Part 15: Advanced Video Coding (AVC) file format," International Standard; ISO/IEC; 14496-15; Apr. 15, 2004; pp. i-v, 1-23. First Edition.

Author Unknown, "Series H: Audiovisual and Multimedia Systems Infrastructure of audiovisual services—Coding of moving video; Advanced video coding for generic audiovisual services," International Telecommunications Union; ITU-T; H.264; Telecommunication Standardization Sector of ITU. Mar. 2009. pp. i-iii, 1-647. Geneva, Switzerland.

Amon, P. et al. "File Format for Scalable Video Coding." IEEE Transactions on Circuits and Systems for Video Technology, vol. 17, No. 9, pp. 1174-1185, Sep. 2007.

Wang, Y.-K. et al. "System and Transport Interface of SVC." IEEE Transactions on Circuits and Systems for Video Technology, vol. 17, No. 9, pp. 1149-1163, Sep. 2007.

Gurler, C. G. et al., "Architectures for Multi-Threaded MVC-Compliant Multi-View Video Decoding and Benchmark Tests", Signal Processing: Image Communication 25, 2010, pp. 325-334.

Kim, Joohee et al., "Network-Adaptive Video Streaming using Multiple Description Coding and Path Discovery", International Conference on Multimedia and Expo (ICME '03), vol. 2, 2003, pp. II-653-II-656.

Kurutepe, Engin et al., "A Standards-Based, Flexible, End-to-End Multi-View Video Streaming Architecture", Packet Video 2007, Lausanne, Switzerland, Nov. 12-13, 2007, pp. 302-307.

Mao, Shiwen et al., "Video Transport Over Ad Hoc Networks: Multistream Coding with Multipath Transport", IEEE Journal on Selected Areas in Communications, vol. 21, No. 10, Dec. 2003, pp. 1721-1737.

Zhou, Yuan et al., "Real-Time Transmission of High-Resolution Multi-View Stereo Video Over IP Networks", 3DTV Conference: The True Vision—Capture, Transmission and Display of 3D Video, 2009, IEEE, Piscataway, New Jersey, USA, May 4, 2009, 1-4.

Unknown, Author, "Annex H: Multiview Video Coding", Recommendation Itu-T H.264, International Telecommunication Union, vol. ITU-T H.264, available online at URL:http://www.itu.int/rec/T-REC-H.264-200903-S/en, 1 Mar. 2009, 596-647.

* cited by examiner

Fig. 3

310
```
forbidden_0_bit (1 bit)
nal_unit_type (5 bits)
output_flag (1 bit)
reserved_0 (1 bit)
stream_id (16 bits)
```

320
```
stream_id (16 bits)
stream_type (4 bits)
version_id (4 bits)
if nal_unit_type == 1 || nal_unit_type == 5 (VCL data)
{
   view_id (10 bits)
   temporal_id (3 bits)
   quality_id (5 bits)
}
dependency_id (4 bits)
reserved_0 (2 bits)
```

330
```
num_representations (8 bits)
for i = 0 to num_representations-1
{
    representation_id (8 bits)
    representation_priority_id (4 bits)
    representation_type (4 bits)
    num_streams
    for j = 0 to num_streams-1
    {
        stream_id (16 bits)
    }
}
```

INDICATING BIT STREAM SUBSETS

TECHNICAL FIELD

The invention relates to a method and device for indicating bit stream subsets in a compressed video bit stream, and a method and device for extracting video packets from a compressed video bit stream. The invention relates also to computer programs and computer program products.

BACKGROUND

H.264, also known as MPEG-4/advanced video coding (AVC), is the state of the art video coding standard. It is a hybrid codec which takes advantage of eliminating redundancy both within each video frame and between frames. The output of the encoding process is video coding layer (VCL) data which is further encapsulated into network abstraction layer (NAL) units prior to transmission or storage. Apart from video data, other data that can be carried in NAL units includes parameter sets, such as sequence parameter sets (SPS) and picture parameter sets (PPS), which carry data that is essential for decoding of VCL data, such as video resolution or required decoder capabilities, or supplemental enhancement information (SEI) that carries information that can be useful for decoders or network elements, but is not essential for decoding VCL data.

The NAL is designed in order to enable simple, effective, and flexible use of the VCL for a broad variety of systems for transport and storage of video data, such as transmission over real-time transport protocol (RTP) or hypertext transport protocol (HTTP), or storage in ISO file formats. The NAL unit concept is supposed to provide a means for networks, i.e., transmission and storage systems, to access, group, and manipulate, compressed bit streams by splitting the bit streams into logical units. For instance, a unit corresponding to one compressed picture is augmented with high-level information indicating to the network whether a coded picture can be used as random access point to start decoding of the compressed video.

NAL is the minimum-size functional unit for H.264/AVC video. A NAL unit can be subdivided into NAL unit header and NAL unit payload. The NAL unit header consists of a set of identifiers that can be used by networks to manage the compressed bit streams. For example, in order to reduce the transmission bit rate of a video in case of limited bandwidth, some NAL units can be discarded based on information carried in the NAL unit headers, so as to minimize the quality degradation caused by discarding video data. This process is denoted as "bit stream thinning".

While traditional video services provide video in a single representation, i.e., using fixed camera position and spatial resolution, multi-resolution and multi-view video representations have recently gained importance. A multi-resolution representation represents the video in several different spatial resolutions, so as to serve target devices with different display resolutions. A multi-view representation represents the content from different camera perspectives, a particular case being the stereoscopic video case, where the scene is captured by two cameras with a distance similar to that of the human eye. Using suitable display technologies, perception of depth can be provided to a viewer.

Multi-resolution and multi-view video representations are often referred to as hierarchical or layered representations, where a base layer represents a basic quality of the video, and successive enhancement layers amend the representations towards higher qualities.

Scalable video coding (SVC) and multi-view video coding (MVC) are video coding standards that can be used to compress multi-resolution and multi-view video representations, respectively, where high compression efficiency is achieved by eliminating redundant information between different layers. SVC and MVC are based on the AVC standard, and included as Annexes G and H in the later editions of AVC, and consequently share most of the AVC structure.

The hierarchical dependencies inherent to SVC and MVC bit streams require additional information fields in the NAL unit headers, such as decoding dependencies and view identifiers. However, in order to retain compatibility with existing AVC implementations, the basic AVC NAL unit header was not changed. Instead, the extra information, such as dependencies and view identifiers, was incorporated by introducing two new types of NAL units, namely a prefix NAL unit (type 14) and a coded slice extension NAL unit (type 20), that are defined as "unused" in AVC and thus ignored by AVC decoders which do not support Annex G or H of the specification.

A prefix NAL unit can be associated with a VCL AVC NAL unit which is supposed to follow immediately after the prefix NAL unit in the bit stream, conveying additional information pertaining to the base layer. AVC decoders will ignore the prefix NAL units and can thus decode the base layer.

A coded slice extension NAL unit is used only in SVC or MVC enhancement layers. It represents enhancement information relative to the base layer or other enhancement layers. Besides conveying dependencies and view identifiers as in the prefix NAL unit, a coded slice extension NAL unit consists both of an SVC or an MVC NAL unit header, as well as corresponding VCL data. Thus, it is a combination of a prefix NAL unit and a VCL AVC NAL unit. SVC and MVC enhancement layer NAL units will be ignored by AVC decoders.

SVC and MVC extensions of AVC are defined in a similar way. Their use is mutually exclusive, i.e., the syntax and semantics defined in the standard are partly conflicting and do not allow using SVC and MVC elements simultaneously. Combining features from SVC and MVC would require changes to the standard, and in particular to the definition of the NAL unit header.

HEVC is a next generation video coding standard that is currently undergoing standardization. HEVC aims to substantially improve coding compared to AVC, especially for high-resolution video sequences.

In terms of high-level syntax design, the most straightforward method is to adopt the concept of AVC high-level syntax, in particular the AVC NAL unit concept. However, this may suffer from the following problems.

According to state of the art, SVC and MVC are built up from AVC in a backward compatible manner. The new NAL unit type 20 is designed with header extension that can be used for any enhancement layer. To solve legacy AVC decoder issues, the old NAL units (type 1, type 5, and other types) are kept and a prefix NAL unit association method is used for each normal AVC VCL NAL unit (type 1 and type 5). While this approach could in principle be taken for HEVC and its later extensions, it has the following problems associated with it.

The introduction of new features or functionality requires definition of new NAL unit types, e.g., coded slice extension NAL units. This may be undesirable since the maximum number of NAL unit types is typically limited, e.g., by the defined length of the NAL unit type field.

In order to take legacy decoders into consideration, a base layer must be created with a legacy NAL unit type with a prefix NAL unit which results in a second new NAL unit type that should be designed, thus further increasing the number of NAL unit types.

The signaling of base layer and enhancement layers is not uniform and requires special treatment through the network for each layer, leading to complex implementations. The use of prefix NAL units is unnatural and provides only a weak link between the necessary header information and the corresponding VCL data. This link may easily break down if, e.g., one of the NAL units is lost in the transmissions.

In case of future extensions, nesting of prefix NAL units is complicated.

By extending the high-level interface through additional NAL unit headers, network functionalities that are supposed to process NAL units based on the information conveyed in the NAL unit headers have to be updated each time the NAL unit headers are extended.

Further problems associated with the state of the art AVC concept are related to the layered representation. Currently, in SVC and MVC, all the flags related to with layer properties, such as view_id, dependency_id, and quality_id, are simply put into NAL unit headers without any intellectual selection or categorization. This requires a client that is receiving the bit stream to have detailed knowledge about the definition of the flags, e.g., if the client wants to prune or manipulate the bit stream. Basically, the client is required to fully understand the meaning of each flag and how they interrelate. Erroneous action may easily be taken, e.g., when one view needs to be extracted from a multi-view bit stream, if the views which it depends on are not included, or a low quality version is selected if a client only considers the view_id flag. Even with some assistance from SEI elements there may be cases where it is very complex for the network to find and understand all the necessary information that is needed to extract a certain video representation from the layered bit stream.

Further, with more and more applications and standards covering 3D, new data elements, such as depth maps and occlusion maps, will be transmitted together with texture, allowing for more flexible rendering of output views at the receiving end. Since such elements form layered representations together with the (multi-view or scalable) "texture" video, it may be desirable to transmit all in the same bit stream. Such bundling of different data elements may alternatively be achieved through signaling on higher system levels, such as transport protocol or file format. However, since software and hardware implementations of such higher-level protocols are often separated from implementations of the video decompression, the exact temporal synchronization of different data elements, such as synchronization of texture with depth, may be very complex if not supported on the bit stream level. Note that the synchronization of different video data elements, such as texture and depth, must be much tighter than the synchronization of video and audio, since the different video elements must be frame aligned. Additionally, video elements, such as texture and depth may be compressed together, e.g., by re-using motion information ("motion vectors") among them, which requires tight coupling on the bit stream level.

The initial focus of the HEVC development is on mono video. However, later extensions towards scalable coding and/or multi-view coding are likely. It is also likely that a packetization concept similar to the NAL unit concept in AVC will be used. Thus, in the following, even though the presented methods are applicable primarily to future video coding standards such as HEVC, the term "NAL unit" will be used in the same sense as it is defined in AVC. Also other AVC concepts such as SPS, PPS, and SEI, are expected to be used in HEVC, and their AVC terminology is therefore used in the following, although they may be called differently in HEVC or any other future video coding standard.

SUMMARY

It is an object of the invention to provide an improved alternative to the above techniques and prior art.

More specifically, it is an object of the invention to provide an improved generic syntax for future video coding standards which facilitates layered video representations.

These and other objects of the invention are achieved by means of different aspects of the invention, as defined by the independent claims. Embodiments of the invention are characterized by the dependent claims.

For the purpose of describing the invention, it is assumed that a video signal is encoded into a compressed video bit stream, transmitted over a network, e.g., a local area network, a mobile phone network, or the internet, and decoded at a client, e.g., a television set, a computer, a video player, or a mobile phone. The network may comprise several network elements, such as routers and switches.

According to a first aspect of the invention, a method of indicating bit stream subsets in a compressed video bit stream is provided. The compressed video bit stream comprises a plurality of, i.e., at least two, bit stream subsets. The method comprises receiving the compressed video bit stream, dividing the video bit stream into video packets, and marking each video packet with a single subset identifier of a plurality of subset identifiers. Each video packet comprises either one of video data or supplemental information. Each subset identifier of the plurality of subset identifiers is associated with a corresponding bit stream subset of the plurality of bit stream subsets.

According to a second aspect of the invention, a computer program is provided. The computer program comprises computer program code. The computer program code is adapted to be executed to implement the method according to the first aspect of the invention.

According to a third aspect of the invention, a computer program product is provided. The computer program product comprises a computer readable medium. The computer readable medium has the computer program according to the second aspect of the invention embodied therein.

According to a fourth aspect of the invention, a method of extracting video packets from a compressed video bit stream is provided. The compressed video bit stream is divided into video packets. The compressed video bit stream comprises a plurality of bit stream subsets. Each video packet comprises either one of video data or supplemental information. Each video packet further comprises a single subset identifier of a plurality of subset identifiers. Each subset identifier is associated with a corresponding bit stream subset of the plurality of bit stream subsets. The method comprises providing at least one relevant subset identifier and receiving video packets from the compressed video bit stream. The method further comprises, for each received video packet, inspecting the subset identifier of the video packet, and extracting the video packet from the compressed video bit stream. The video packet is extracted from the compressed video bit stream under the condition that the extracted subset identifier matches one of the at least one relevant subset identifier.

According to a fifth aspect of the invention, another computer program is provided. The computer program comprises a computer program code. The computer program code is adapted to be executed to implement the method according to the fourth aspect of the invention.

According to a sixth aspect of the invention, a computer program product is provided. The computer program product comprises a computer readable medium. The computer readable medium has the computer program according to the fifth aspect of the invention embodied therein.

According to a seventh aspect of the invention, a bit stream marker for indicating bit stream subsets in a compressed video bit stream is provided. The compressed video bit stream comprises a plurality of bit stream subsets. The bit stream marker comprises a receiving unit, a packetizing unit, and a marking unit. The receiving unit is arranged for receiving the compressed video bit stream. The packetizing unit is arranged for dividing the compressed video bit stream into video packets. Each video packet comprises either one of video data or supplemental information. The marking unit is arranged for marking each video packet with a single subset identifier of a plurality of subset identifiers. Each subset identifier is associated with a corresponding bit stream subset of the plurality of bit stream subsets.

According to an eighth aspect of the invention, a bit stream extractor for extracting video packets from a compressed video bit stream is provided. The compressed video bit stream is divided into video packets. The compressed video bit stream comprises a plurality of bit stream subsets. Each video packet comprises either one of video data or supplemental information. Each video packet further comprises a single subset identifier of a plurality of subset identifiers. Each subset identifier is associated with a corresponding bit stream subset of the plurality of bit stream subsets. The bit stream extractor comprises a subset selecting unit, a receiving unit, and an extracting unit. The subset selecting unit is arranged for providing at least one relevant subset identifier. The receiving unit is arranged for receiving video packets from the compressed video bit stream. The extracting unit is arranged for, for each received video packet, inspecting the subset identifier of the video packet and extracting the video packet from the compressed video bit stream. The video packet is extracted from the compressed video bit stream under the condition that the extracted subset identifier matches one of the at least one relevant subset identifier.

The invention makes use of an understanding that the layered bit stream concept of state of the art video coding standards may be generalized so as to allow identification of different bit stream subsets, wherein each bit stream subset represents a layer having certain properties associated with it. For instance, each bit stream subset may represent either a VCL layer carrying video data, such as a texture base view layer, a depth map high-quality layer, a temporal occlusion map layer, or a non-VCL layer carrying non-video data, i.e., supplemental information, e.g., parameter sets. This is achieved by associating each layer, i.e., bit stream subset, with a stream identifier (stream_id) which, in turn, is associated with parameters describing properties of the layer, such as a specific view identifier (view_id), dependency identifier (dependency_id), or the like. The stream_id is signaled in the NAL unit headers.

By synthesizing all different properties of a certain layer into a single identifier, stream_id, the process of interpreting and identifying video packets in the network and on the client side is simplified. The suggested syntax allows for a clean and extensible system design for network-friendly high-level video bit stream signaling which is particularly adapted for layered representations and therefore is compatible with future video codecs and applications. Video bit stream signaling in accordance with an embodiment of the invention is advantageous in that problems inherent to the state of the art video coding standards, in particular the AVC NAL unit concept described hereinbefore, are mitigated.

More specifically, new functionality does neither require definition of new NAL unit types nor updating the NAL unit header syntax. Further, since the properties of a layer are condensed into a single stream_id, network elements and clients processing the video bit stream are not required to have detailed knowledge of all information elements, i.e., identifiers, indicators, parameters, or flags, used in NAL unit headers. Rather, knowledge of relevant stream_ids suffices. Finally, signaling of layered video bit streams, i.e., several bit stream subsets multiplexed into one compressed video bit stream, is advantageous in that exact temporal synchronization is easier to accomplish than in solutions relying on higher-level signaling. In addition, redundancy between related layers of a video representation may be utilized in compressing the video signal.

Even though it has been stated that each video packet in the compressed video bit stream is marked with a single subset identifier, one may also envisage embodiments of the invention which only mark a subset of all video packets comprised in the compressed video bit stream with a single subset identifier.

According to an embodiment of the invention, the method further comprises providing at least one subset definition. Each subset definition describes properties of a corresponding bit stream subset of the plurality of bit stream subsets. Utilizing subsets definitions for defining properties of associated bit stream subsets is advantageous in that the properties of a corresponding video layer may be provided explicitly to network elements and clients.

According to an embodiment of the invention, the at least one subset definition is provided as a video packet in the compressed video bit stream. A video packet may carry multiple subset definitions, each subset definition corresponding to a different bit stream subset. A video packet comprising one or several subset definitions may be carried in a parameter stream set (StPS). This is advantageous in that subset definitions, describing properties of their associated bit stream subsets, i.e., video or parameter layers, may be provided to network elements and clients together with the video signal. Each subset definition comprises information pertaining to at least one of temporal_id, view_id, quality_id, priority_id, or the type of data carried in the subset. It will also be appreciated that one or more bit stream subsets may be reserved for signaling subset definitions or other parameters. Such reserved bit stream subsets may be associated with predefined stream_ids, e.g., stream_id=0, known to network elements and clients.

According to an embodiment of the invention, each subset identifier of the plurality of subset identifiers is a numerical value. The value of each subset identifier corresponds to a relative priority of its associated bit stream subset. In other words, the subset identifier, stream_id, of each bit stream subset indicates the importance of the video data carried by a specific bit stream subset. Using such information, network elements or clients which need to discard packets, e.g., due to limited bandwidth, may discard packets with a high stream_ids, indicating low relevance, and keep packets with low stream_ids, indicating high relevance.

According to an embodiment of the invention, the method further comprises providing at least one video representation definition. Each video representation definition comprises at least one relevant subset identifier. The bit stream subsets associated with the at least one relevant subset identifiers form a decodable video representation. In other words, each video representation groups several stream_ids, and their associated bit stream subsets, to form a decodable video. This is unlike a subset definition identifying a single bit stream subset which may not be independently decodable. A video representation may, e.g., comprise all texture information, or texture and depth map information for a base view. This is advantageous in that network elements or clients may be provided with information as to which bit stream subsets need to be processed in order to successfully decode a certain video representation.

According to an embodiment of the invention, the at least one video representation definition is provided as a video packet in the compressed video bit stream. This is advantageous in that information pertaining to a video representation, i.e., a list of stream_ids which need to be processed so as to form a decodable video, may be signaled together, i.e., multiplexed, with the video data. A video packet may carry multiple video representation definitions, each video representation definition corresponding to a different decodable video representation having certain characteristics, i.e., properties. A video packet comprising one or several video representation definitions may be carried in a bit stream subset reserved for this purpose, referred to as representation parameter set (RPS). The RPS may be associated with a predefined stream_id, e.g., stream_id=0. It will also be appreciated that a video representation may be associated with a numerical value which indicates the relative priority of a video representation.

According to an embodiment of the invention, the method further comprises, for each received video packet, forwarding or decoding the extracted video packet or discarding the received video packet. The received video packet is discarded under the condition that the extracted subset identifier does not match any of the at least one relevant subset identifier. In other words, a received video packet is processed, i.e., forwarded or decoded, if its associated stream_id matches a list of relevant stream_ids, otherwise it is discarded. This is advantageous in that network elements or clients may process received video packets depending on whether they are relevant or not. For instance, a client may be configured to only process certain bit stream subsets, e.g., a group of subsets which together form a decodable video, i.e., a video representation. Further, a network element may be configured to discard bit stream subsets which are considered less relevant, e.g., high-quality enhancement layers in the case of limited bandwidth.

According to an embodiment of the invention, the method further comprises providing a subset definition. The subset definition describes properties of a corresponding bit stream subset of the plurality of bit stream subsets. The method further comprises using the subset identifier which is associated with the corresponding bit stream as the at least one relevant subset identifier. Using a stream_id which is comprised in a subset definition is advantageous in that it allows network elements and clients to select video packets for processing as specified by a subset definition.

According to an embodiment of the invention, the method further comprises selecting the subset definition from a plurality of subset definitions. The subset definition is selected according to at least one property of the corresponding bit stream subset. This is advantageous in that, if several subset definitions are provided, network elements or clients may select a bit stream subset for processing which has certain properties. For instance, a client may select a subset definition comprising a certain indicator, e.g., a certain temporal_id, view_id, quality_id, priority_id, or indicating a certain type of data carried in the subset.

According to an embodiment of the invention, the method further comprises receiving the subset definition from a video packet in the compressed video bit stream. This is advantageous in that subset definitions, describing properties of their associated bit stream subsets, i.e., video or parameter layers, may be received by network elements and clients together with the video data.

According to an embodiment of the invention, the method further comprises receiving the video representation definition from a video packet in the compressed video bit stream. This is advantageous in that information pertaining to a video representation, i.e., several stream_ids which need to be processed so as to form a decodable video, may be received together with the video data.

Even though advantages of the invention have in some cases been described with reference to embodiments of the methods according to the first and the fourth aspect of the invention, corresponding reasoning applies to embodiments of the computer programs according to the second and fifth aspect of the invention, the computer program products according the third and sixth aspect of the invention, as well as the devices according to the seventh and eighth aspect of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which:

FIG. 3 illustrates the proposed syntax, in accordance with embodiments of the invention.

All the figures are schematic, not necessarily to scale, and generally only show parts which are necessary in order to elucidate the invention, wherein other parts may be omitted or merely suggested.

DETAILED DESCRIPTION

Figure 1:
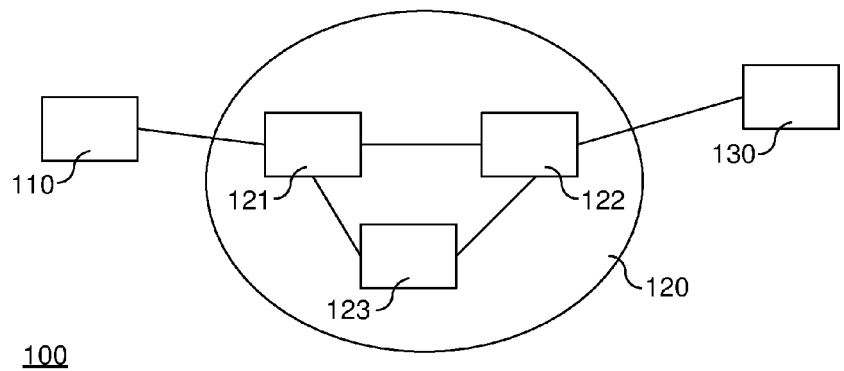
FIG. 1 shows a system for encoding, transporting, and decoding, of video signals.

For the purpose of elucidating the invention, a system 100 for encoding, transporting, and decoding, video signals is illustrated in FIG. 1.

System 100 comprises a video encoding device 110, a transport network 120, and a video decoding device 130. Typically, video encoding device 110 receives a video signal from one or several sources and is arranged for compressing the video signal as well as sub-dividing the resulting bit stream into video packets, e.g., NAL units. The resulting video packets are then transported through transport network 120 to decoding device 130. Transport network 120 typically comprises multiple interconnected nodes, i.e., network elements, 121-123 which are arranged for transporting video packets from encoding device 110 to decoding device 130. Network elements 121-123 may, e.g., be switches, routers, or any other type of network node suitable for processing video packets. Transport network 120 may, e.g., be a local area network, a mobile phone network, or the Internet.

Decoding device 130 is arranged for receiving video packets from transport network 120 and for decoding the received compressed video bit stream. Further, decoding device 130 may be arranged for displaying the decoded video to a viewer. Decoding device 130 may, e.g., be a video player, a television set, a computer, or a mobile phone.

In the following, embodiments of the invention are described with reference to FIG. 2, which illustrates the concepts of stream identifiers, subset definitions, and video representations.

Figure 2:
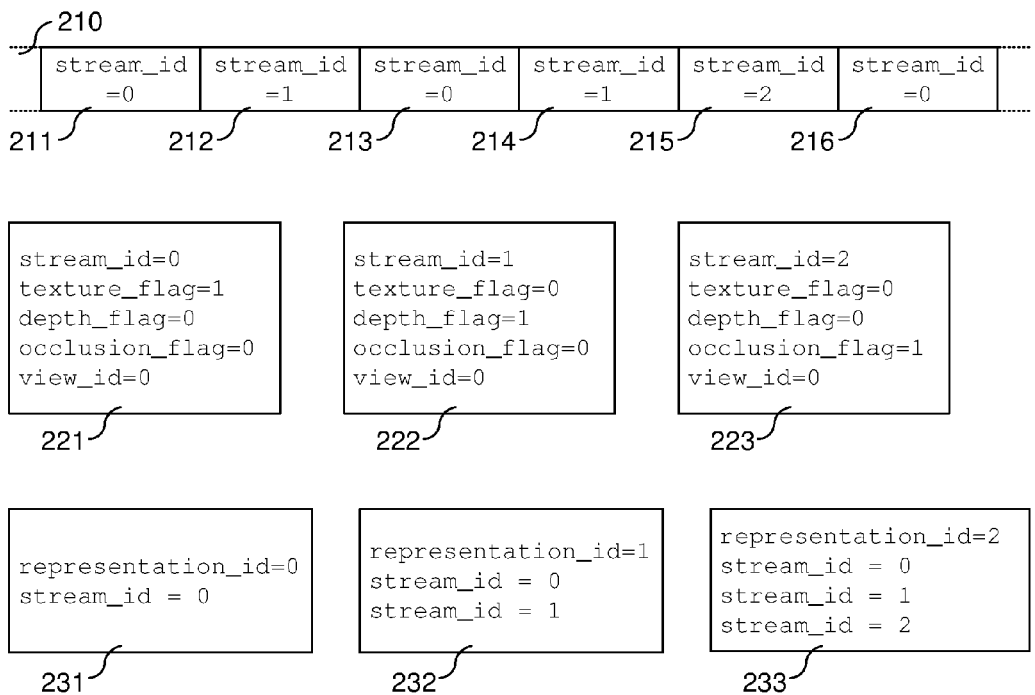
FIG. 2 illustrates the concepts of bit stream subsets, subset definitions, and video representation definitions, in accordance with embodiments of the invention.

In FIG. 2, a section of a compressed video bit stream 210 is shown. The section comprises six video packets, i.e., NAL units, 211-216, each of which may comprise video data or supplemental information, such as parameters. Further, each NAL unit 211-216 comprises a flag stream_id for the purpose of associating each NAL unit 211-216 with a corresponding bit stream subset of the compressed video bit stream. For instance, for video bit stream section 210 exemplified in FIG. 2, NAL units 211, 213, and 216, are marked with stream_id=0, i.e., they are associated with a first bit stream subset. Further, NAL units 212 and 214 are marked with stream_id=1, i.e., they are associated with a second bit stream subset which is different from the first bit stream subset. Finally, NAL unit 215 is marked with stream_id=2, i.e., it is associated with a third bit stream subset which is different from the first and second bit stream subset.

By means of the identifier stream_id, which is comprised in each of the NAL units carried in a compressed video bit stream, a bit stream subset to which the NAL unit belongs to is indicated for each NAL unit. Since each bit stream subset carried in the compressed video bit stream represents a certain layer of the compressed video signal, e.g., a texture base view layer, a depth map high-quality layer, a parameter set layer, a temporal layer, an occlusion map layer, or any other type of video or supplemental layer, each NAL unit is associated with a corresponding layer. In this way, all parameters associated with a certain layer, e.g., parameters describing which view a layer represents, which video quality a layer contains, or dependencies between layers, are condensed into a single stream identifier, stream_id. Using a single identifier for describing a set of parameters introduces a level of indirection which allows for a simplified processing of NAL units by networks elements, through which they are transported, or clients, by which they are decoded.

The properties of each layer, i.e., bit stream subset, may be predefined and known to all entities involved in coding, transporting, and decoding, of video signals. For instance, with reference to FIG. 1, decoding device 130 may be configured for decoding only video packets belonging to one or a few of the different bit stream subsets, or layers, received from encoding device 110 over transport network 120. This may, e.g., be the case if stream_id=0 is a base layer, whereas stream_id=1 and stream_id=2 are enhancement layers for providing an improved video quality, and decoding device 130 is only capable of displaying low quality video signals. Further, network elements 121-123 may be configured for forwarding only video packets belonging to one or two of the three bit stream subsets, if the available bandwidth is limited.

Further with reference to FIG. 2, an improved processing of video layers comprised in a multi-layer video bit stream is described.

In accordance with an embodiment of the invention, the properties of each layer, i.e., bit stream subset, are provided to the entities involved in encoding, transporting, and decoding, of video signals by means of subset definitions 221-223. For each layer, a corresponding subset definition 221-223 is provided which comprises information, i.e., parameters, describing properties of the layer. For instance, subset definition 221 describes properties of the first bit stream subset, as is indicated by stream_id=0. Correspondingly, subset definition 222 describes properties of the second bit stream subset, i.e., stream_id=1, and subset definition 223 describes properties of the third bit stream subset, i.e., stream_id=2. The parameters comprised in each subset definition 221-223, i.e., texture_flag, depth_flag, occlusion_flag, and view_id, indicate whether the bit stream subset is a texture layer, a depth map layer, an occluded texture layer, and which view it belongs to. For the subset definitions 221-223 exemplified in FIG. 2, all layers belong to the same view, with view_id=0. The first layer, described by subset definition 221, contains the texture of the view, the second layer, described by subset definition 222, contains the depth map of the view, and the third layer, described by subset definition 223, contains the occluded texture of the view.

Further with reference to FIG. 2, the concept of video representations is described, in accordance with an embodiment of the invention.

A video representation is used for grouping one or more layers, i.e., bit stream subsets, together to form a decodable video. This grouping mechanism may be used to provide network elements and clients involved in processing the compressed video bit stream with information about the bit stream subsets. This is achieved by providing integrated information, comprised in a video representation definition, to network elements and clients. To this end, a video representation may, e.g., comprise all texture information in the bit stream, or texture and depth map information for a base view. A network element, or client, which wants to extract a certain video representation from the compressed video bit stream, e.g., for the purpose of decoding the video signal and displaying the video to a viewer, would identify a relevant video representation and subsequently extract all bit stream subsets which are part of the video representation.

A video representation in accordance with an embodiment of the invention, such as video representations 221-223 illustrated in FIG. 2, are marked with a video representation identifier, representation_id, for the purpose of facilitating identification of video representations by network elements and clients. Further, each video representation comprises a list of stream_ids indicating bit stream subsets which are required in order to be able to decode the video signal, thereby rendering a meaningful video.

For instance, the first video representation, as defined by representation definition 231, is marked with representation_id=0 and comprises a single bit stream subset identifier, stream_id=0. Thus, given the definition 221 of the bit stream subset with stream_id=0, the first representation is a mono 2D video sequence, i.e., a single view of texture information. Further, the second video representation, as defined by representation definition 232, is marked with representation_id=1 and comprises a list of two bit stream subset identifiers, stream_id=0 and stream_id=1. Therefore, given the subset definitions 221 and 222, the second video representation allows to render a 3D video sequence since it further comprises a depth map, carried by the layer with stream_id=1. However, since the second video representation does not contain any occluded texture information, the rendered 3D video is of limited quality. This problem is addressed by the third video representation, which allows rendering of a 3D video sequence including occluded texture information. For this purpose, video representation definition 233 comprises a list of three bit stream subset identifiers, stream_id=0, stream_id=1, and stream_id=2.

It will be appreciated that the concepts of layered bit streams, subset definitions, and video representations, are not limited to only one view, as was exemplified hereinbefore. Rather, subset definitions may, e.g., be used to describe properties of layers representing different views, e.g., view_id=0 and view_id=1, having different camera angles, or layers which carry video signals of different video quality.

The concept of video representations allows for a simplified processing of multiple-layer video bit streams by network elements and clients involved in processing the video bit stream. A network element which wants to forward, or a client which wants to decode, a certain video representation may simply identify the corresponding representation definition, read the list of required bit stream subset identifiers from the representation definition, and extract video packets which belong to the required bit stream subsets from the compressed video bit stream.

Compared to known methods for identifying bit stream subsets, such as SVC NAL unit header extensions which use several identifiers, e.g., temporal_id, priority_id, quality_id, dependency_id, and the like, the proposed method uses only a single identifier and thus allows for much simpler implementations of both hard- and software. In particular, the single identifier, stream_id, does not have any predefined meaning, unlike, e.g., dependency_id, but its meaning is indicated through secondary means, e.g., subset definitions. Due to this indirection the proposed concept is easily extensible if new functionality is introduced in a later stage, since information pertaining to such functionality may be signaled in subset definitions, and no changes to NAL unit headers are necessary. In particular, a NAL unit header in accordance with an embodiment of the invention may have a fixed length, regardless of whether extensions are used or not, which makes the parsing of NAL unit headers much simpler than with known solutions.

With reference to FIG. 3, a more detailed description of embodiments of the invention, in particular related to the proposed syntax, is presented in the following.

The subset identifier, stream_id, is carried in the NAL unit header. The NAL unit header may or may not contain other identifiers, such as NAL unit type, output_flag, or others. An example for a NAL unit header 310 is illustrated in FIG. 3, where forbidden_zero_bit shall be equal to zero, nal_unit_type specifies the type data contained in the NAL unit, and output_flag signals whether the decoded content of the current NAL unit is intended for screen output.

By marking different NAL units with the same stream_id, they are marked as belonging to the same bit stream subset, i.e., the same layer. Typically, all NAL units belonging to the same bit stream subset share one or more specific properties, e.g.:
  All NAL units in the subset are parameter sets,
  All NAL units in the subset are intra-coded pictures,
  All NAL units in the subset indicate the start of a so-called "closed group of pictures (GOP)" random access point (instantaneous decoder refresh (IDR) pictures in AVC),
  All NAL units in the subset indicate the start of a so-called "open GOP" random access point (intra pictures that allow for start of decoding),
  All NAL units in the subset carry a video frames representing a basic quality,
  All NAL units in the subset carry temporal refinement information,
  All NAL units in the subset carry spatial refinement information in case of spatial scalability,
  All NAL units in the subset carry information corresponding to a certain camera view in multi-view coding, or
  All NAL units in the subset carry information about a certain video stream or, e.g., depth map stream.

Note that multiple such properties may be simultaneously valid for a given subset.

The properties of some subsets, and associated stream_ids, may be predefined. For instance, stream_id=0 may indicate a subset which contains only NAL units which carry parameter sets, such as SPS, PPS, StPS, or RPS. Alternatively, SPS, PPS, StPS, and RPS, may have predefined, but different, stream_ids.

Information pertaining to properties of a subset may be provided explicitly, e.g., by means of a subset definition. The subset definition may, e.g., comprise parameters such as temporal_id, quality_id, or alike. An example subset definition 320 is shown in FIG. 3.

The syntax of a subset definition in accordance with an embodiment of the invention, such as subset definition 320, may include conditional fields which depend, e.g., on the NAL unit type or other properties. Subset definition 320 exemplifies syntax elements which may be used only if the referring NAL unit contains VCL data, and not non-VCL data (note that, in the present disclosure, the NAL unit types in the example are in accordance with AVC specifications).

In subset definition 320, stream_id identifies a layered stream which is a subset of a bit stream, stream_type describes the type of stream that is being specified, and version_id specifies the version of the specification according to which the stream is described. Each of the flags view_id, temporal_id, quality_id, and dependency_id, identify a property or the corresponding layer. More specifically, view_id indicates a camera view, temporal_id indicates a temporal refinement layer, e.g., a 60 Hz refinement on top of a 30 Hz frame rate, quality_id indicates signal fidelity of the compressed video, and dependency_id indicates a spatial refinement layer in case of spatial scalability.

The subset definition itself may be carried in the bit stream, e.g., in the form of a dedicated NAL unit, i.e., an StPS. Such a dedicated NAL unit may be indicated by a dedicated NAL unit type. It may also be part of a dedicated subset, such as the bit stream subset of parameter sets, as indicated by a specific stream_id in the NAL unit header of NAL units carrying parameter sets. The subset carrying such stream parameter set NAL units may have a predefined stream_id, such as stream_id=0.

The StPS may include parameters pertaining to temporal enhancement (temporal_id), quality enhancement (quality_id), spatial enhancement (dependency_id), priority (priority_id), or any signaling such as that carried in NAL unit extension headers for SVC and MVC. It may also contain information about the type of data carried in the associated NAL units, i.e., whether it contains parameter sets, SEI messages, intra pictures, anchor pictures, or the like. It may also carry higher level information about the content that the compressed data represents, e.g., whether the associated NAL units represent texture data, depth information, occlusion information, or the like.

The stream parameter set syntax in accordance with an embodiment of the invention, such as subset definition 320 exemplified in FIG. 3, may be defined in an extensible fashion. To this end, it may include syntax elements that are defined by a certain version of the specification, e.g., version N. In a later update of the specification, e.g., version N+1, additional syntax elements may be included. In this case, a receiving device complying with version N of the specification would only be able to interpret the version N syntax elements, whereas a receiving device complying with version N+1 would be able to interpret also the additional syntax elements. In this case, the StPS may have a flexible length and can be extended in new versions of the specification, if needed. Should a version N receiving device receive a version N+1 StPS, which comprises parameters which comply with version N and further parameters which comply with version N+1, it may read the version N syntax elements and ignore the version N+1 syntax elements. Alternatively, a version N receiving device may decide to drop NAL units associated with the StPS in case it discovers syntax elements that it cannot interpret since they do not comply with version N. The device behavior, i.e., whether to ignore unknown syntax or to drop associated NAL units, may be signaled, e.g., by a separate flag.

The stream parameter set syntax may further include a version identifier to indicate the version of specification which it complies with. The version identifier could for instance be represented as a numerical value, where increasing values indicate increasing version numbers. If a version N receiving device receives an StPS with a version number less than or equal to N, it will be able to interpret the syntax. If a version N receiving device receives an StPS with a version number larger than N it will not be able to interpret the syntax, at least not the part that is specific to the version with version number larger than N. In that case, it may drop the NAL units associated with the StPS. Alternatively, it may decode the NAL units associated with the StPS, without interpreting the StPS itself. This behavior may be controlled by an additional flag.

As indicated in subset definition 320, the association of stream parameter set and NAL units comprised in the subset may be provided by means of the parameter stream_id, such that the stream parameter set, i.e., the NAL unit comprising the subset definition, as well as the associated NAL units are marked with the same stream_id. Alternatively, an StPS may indicate association with more than one stream_id, e.g., by comprising a list of stream_ids, indicating that the StPS corresponds to NAL units with either of these stream_ids. As a further alternative, the StPS may indicate a bit mask field, such as M="1111111100000000" (decimal 65280) and a value field, e.g., V="1010101000000000" (decimal 43520), and all NAL units with stream_ids matching a condition like "stream_id & M=V", where "&" is the bit-wise "and" operation, are associated with the StPS. Associating multiple stream_ids with the same StPS has the advantage that fewer StPS packets are required to carry the parameters pertaining to properties of the subset. In this way, information which is valid for several bit stream subsets, corresponding to several distinct stream_ids, may be carried in a single StPS. Additional information, which is only valid for one, or some, of those subsets can be carried in separate StPSs.

The stream_id may be a numerical value, and it may be defined such that NAL units with lower stream_ids carry more important data, such as parameter sets or intra frames, whereas NAL units with higher stream_ids carry less important data, such as SEI or temporal enhancement data. Using such priority information, a network node which needs to discard packets, e.g., because of bandwidth limitations, may discard packets with high values of stream_id and keep packets with low values of stream_id.

An advantage of the stream_id concept, as compared to using several parameters, such as temporal_id, dependency_id, and the like, as in SVC and MVC, is that it does not require new fields to be introduced when new codec functionality emerges, because it uses a level of indirection. Further, if the stream_id is represents a relative priority of its associated bit stream subset, the indirection does not even have to be resolved in some cases, further simplifying making the parsing and dispatching of NAL units.

By providing a list of stream_ids in a video representation a part of the compressed video bit stream which can be decoded independently from other parts of the bit stream may be identified. The associated bit stream subsets form a decodable video, i.e., there are no inter-picture or inter-view dependencies to NAL units outside the representation. This is unlike a bit stream subset identified by a single stream_id, which may not be independently decodable, e.g., if it contains only temporal enhancement information. A video representation may be associated with certain properties, such as type of content, e.g., texture, depth, or occlusion information.

The definition of a video representation, i.e., the list of required stream_ids, and the additional properties of the representation, may be provided in a separate video packet in the bit stream, i.e., an RPS. There are at least two ways of providing representation parameter sets. One is to provide exactly one RPS in one NAL unit. As an alternative, one may provide several RPSs in a single NAL unit, as is illustrated by NAL unit 330, in accordance with an embodiment of the invention.

In video representation definition 330, num_representations is the number of representations specified in this NAL unit, representation_id identifies a video representation, representation_priority_id defines the priority of the representation, and representation_type is the type of video representation. The type of video representation may, e.g., be any one of:
Monoscopic video with texture only,
Stereoscopic video with texture only and stereo application,
Monoscopic video with texture and depth information which may produce some autostereoscopic/stereo effects using view synthesis,
Stereoscopic video with texture and depth information which may produce good autostereoscopic effects using view synthesis,
Monoscopic video with texture, depth, and disocclusion information, which may produce good autostereoscopic/stereo effect using view synthesis, and
SPS and PPS which are transmitted to network elements and clients out-of-band beforehand using a non-lossy channel.

Further with reference to video representation definition 330, num_streams signals the number of required streams contained in this representation, and each stream_id specifies a required stream. Optionally, the NAL unit carrying the RPS information may be marked with a predefined stream_id, e.g., stream_id=0.

As was indicated in representation definition 330, one of the properties defined by an RPS may be a priority indicator, representation_priority_id, indicating a priority value of the current representation relative to other video representations.

Based on representation definitions, RPSs, and subset definitions, StPSs, a dynamic streaming approach may be applied in a simple manner. For example, a server may provide a video bit stream having three bit stream subsets, i.e., layers, identified by a quality_id=0, 1, and 2, respectively. These streams are selectively combined into to three video representations, with low, medium, and high-quality, where the low quality representation contains the subset with quality_id=0, the medium quality representation contains the two subsets with quality_id=1 and quality_id=2, and the third representation contains all three subsets. A client may start downloading the first stream, which has lowest quality but smallest size, to get a short buffering time. After playing the video for a while, the client may switch to the medium or high-quality representation if it detects network bandwidth to be available. When congestion happens in the network, the client may downgrade to a lower quality level.

Having quality_id and other parameters defined in the subset definitions facilitates the selection of required bit stream subsets. To this end, a client is simply instructed with rules regarding stream_id, rather than having to parse and interpret several identifiers as would be the case with SVC NAL unit headers. Note that, instead of signaling quality_id, a bandwidth_id may be signaled alternatively to indicate the required bitrate, as bandwidth typically has a positive correlation with quality.

Network elements, such as video packet receivers or video packet forwarders which receive or forward packets, or decoding devices which receive and decode video packets, may interpret the stream_id as follows, in accordance with embodiments of the invention. It is assumed that the network or decoding device is provided with a list of stream_ids that are considered relevant for the receiving, forwarding or decoding operation. As a video packet is received, the stream_id is inspected. According to the value of the stream_id, the video packet is either received/forwarded/decoded, i.e., extracted from the bit stream, or discarded. That is, if the stream_id in the video packet matches one of the relevant stream_ids, the packet is further processed. Otherwise, it is discarded and not further processed.

The list of relevant stream_ids may contain predefined stream_ids. For instance, it may contain stream_id=0 which indicates that the associated bit stream subset contains parameter sets. In this way, the receiving/forwarding/decoding device would receive all parameter sets. It could then, e.g., interpret one or some of the StPSs or RPSs and update the list of relevant stream_ids accordingly. To this end, the receiving device may receive all StPSs, and inspect the StPS syntax for certain properties. If a StPS with a given property, e.g., a type of video data, such as texture data, is detected, then the video packets having the associated stream_ids are extracted from the bit stream. In that way, an StPS, and the associated stream_ids, can be selected based on parameters carried in the StPS, such as temporal_id, view_id, quality_id, a type of video data, or the like.

The relevance of a subset may also be determined based on a version identifier carried in the associated StPS. If the receiving device complies with the version identifier indicated in the StPS, it may extract the associated NAL units. Otherwise, it may discard them.

The list of relevant stream identifiers may also be obtained by inspecting a representation definition which is considered relevant. In this case, the list of stream identifiers is extracted from the representation definition and used as relevant stream identifiers.

A receiving device may receive all RPSs, and inspect the RPS syntax for certain properties, e.g., priority, type of video content, or resolution of the video. If an RPS with a given property is detected, then all associated stream_ids are considered relevant and extracted from the bit stream.

Alternatively, a receiving/forwarding/decoding device may base the decision whether to extract or discard a packet based on the priorities of the respective NAL units. In particular, if the stream_ids are defined according to relative priorities of the bit stream subsets, the receiving/forwarding/decoding device may extract packets with "lower" stream_ids, i.e., comprising more important data, and discard packets with "higher" stream_ids, i.e., comprising less important data. The decision whether a stream_id is "low" or "high" may be based on a threshold. This approach may be used for package dropping or bit stream thinning in a network element in case of bandwidth limitations.

In order to elucidate the invention even further, an example is presented in the following. The example relates to the case of stereoscopic video, i.e., two views with view_id=0 and view_id=1, respectively, with accompanying depth data. Both the texture and depth videos are assumed to provide some temporal scalability, indicated by different temporal_ids, where temporal_id=0 indicates a temporal base quality, e.g., video at 30 Hz frame rate, and temporal_id=1 with temporal enhancement information, e.g., to enhance the 30 Hz frame rate to 60 Hz.

NAL units carrying data pertaining to both texture and depth for the available views and temporal resolutions are multiplexed into the same bit stream, using several bit stream subsets. Using the concept of bit stream subsets and video representations, in accordance with embodiments of the invention, they can be uniquely identified.

The following table provides an example for subset definitions:

| stream_id | Content |
|---|---|
| 1 | Texture: SPS PPS |
| 2 | Texture: view_id = 0, temporal_id = 0 |
| 3 | Texture: view_id = 0, temporal_id = 1 |
| 4 | Texture: view_id = 1, temporal_id = 0 |
| 5 | Texture: view_id = 1, temporal_id = 1 |
| 6 | Depth map: SPS PPS |
| 7 | Depth: view_id = 0, temporal_id = 0 |
| 8 | Depth: view_id = 0, temporal_id = 1 |
| 9 | Depth: view_id = 1, temporal_id = 0 |
| 10 | Depth: view_id = 1, temporal_id = 1 |

There are five subsets, with stream_id=1-5, corresponding to the texture data, view_id=0 and view_id=1, and five further subsets, with stream_id=6-10, corresponding to the depth data. The subsets with stream_id=1 and stream_id=6 indicate subsets that carry sequence parameter sets (SPS) and picture parameter sets (PPS), respectively, i.e., non-VCL data. The remaining stream_ids indicate subsets that carry VCL data.

Further, an example of corresponding representation definitions is illustrated in the following table:

| representation_id | Content |
|---|---|
| 0 | Texture parameter set: 1 |
| 1 | Depth parameter set: 6 |
| 2 | Texture base layer fast forward: 1, 2 |
| 3 | Texture base layer: 1, 2, 3 |
| 4 | Texture 2-view: 1, 2, 3, 4, 5 |
| 5 | All base layer fast forward: 1, 2, 6, 7 |
| 6 | All base layer: 1, 2, 3, 6, 7, 8 |

Here, the representation with representation_id=0 comprises the NAL units with stream_id=1, which is only SPS and PPS for the texture part. As another example, the representation with representation_id=3 comprises stream_ids=1, 2, and 3, which represents a single view video with view_id=0 comprising only texture information. As a further example, representation_id=7 corresponds to the complete bit stream.

After receiving the representation definitions, a receiving or forwarding device can decide on the most suitable representation for the given application, depending on the signaled properties, thereby obtaining a list of relevant stream_ids. It can then easily extract the NAL units that are associated with these stream_ids, by inspecting the NAL unit headers of incoming NAL units.

In the following, embodiments of a method of indicating bit stream subsets in a compressed video bit stream are described with reference to FIG. 4. An embodiment of the method may, e.g., be performed in a sending device, such as encoding device 110, described with reference to FIG. 1. In particular, an embodiment of the method may be performed in a bit stream marking device, i.e., a bit stream marker, which receives a compressed video bit stream from a video encoder. To this end, an embodiment of the method may also be implemented in a video encoder. The bit stream marker subdivides the bit stream into video packets, each video packet containing compressed video data, e.g., a video frame, supplemental information, or, generally, an NAL unit. Then, each video packet is marked with a single subset identifier, using a syntax element stream_id in the NAL unit header, in accordance with an embodiment of the invention. Optionally, the video encoder may provide a packetized video bit stream to the bit stream marker, in which case the bit stream marker would not have to subdivide the bit stream into packets. Further, the marking procedure, in accordance with an embodiment of the invention, may be performed by the video encoder rather than in a separate bit stream marker.

Figure 4:
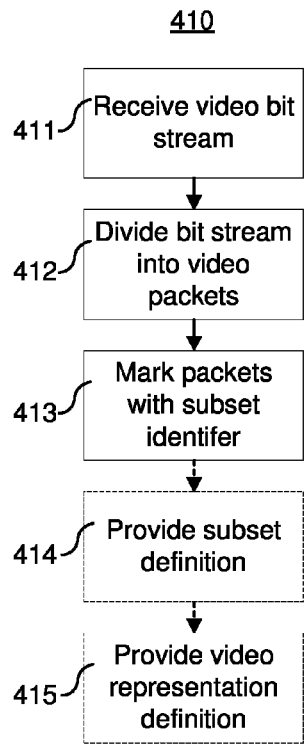
FIG. 4 shows a method of indicating bit stream subsets in a compressed video bit stream, in accordance with an embodiment of the invention.

An embodiment 410 of the method of indicating bit stream subsets in a compressed video bit stream is illustrated in FIG. 4. Method 410 comprises receiving 411 the compressed video bit stream, e.g., from a video encoder, dividing 412 the compressed video bit stream into video packets, and marking 413 each video packet with a single subset identifier of a plurality of subset identifiers, wherein each subset identifier of the plurality of subset identifiers is associated with a corresponding bit stream subset of the plurality of bit stream subsets.

Optionally, method 410 may further comprise providing 414 at least one subset definition, wherein each subset definition describes properties of a corresponding bit stream subset of the plurality of bit stream subsets. The subset definitions may be provided as a video packet in the compressed video bit stream and transmitted to network elements and clients.

In addition to the subset definitions provided in step 414, method 410 may further comprise providing 415 at least one video representation definition, wherein each video representation definition comprises at least one relevant subset identifier, and wherein all the bit stream subsets associated with the at least one relevant subset identifier form a decodable video representation. The at least one video representation definition may be provided as a video packet in the compressed video bit stream and transmitted to network elements and clients.

In the following, embodiments of a method of extracting video packets from a compressed video bit stream divided into video packets are described with reference to FIG. 5. An embodiment of the method may, e.g., be performed in a receiving device, such as network elements 121-123 or decoding device 130, described with reference to FIG. 1. In particular, an embodiment of the method may be performed in a bit stream extracting device, i.e., a bit stream extractor, which receives a compressed video bit stream divided into video packets. To this end, an embodiment of the method may also be implemented in a video decoder or in a network element which is arranged for routing video packets.

Figure 5:
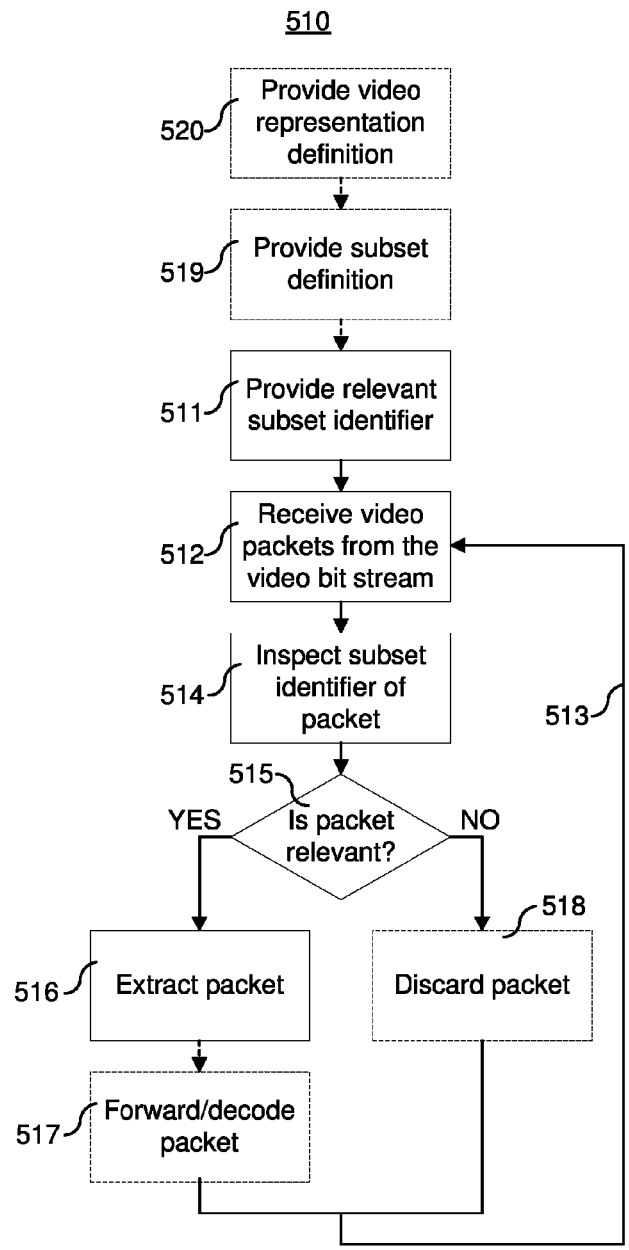
FIG. 5 shows a method of extracting video packets from a compressed video bit stream, in accordance with an embodiment of the invention.

An embodiment 510 of the method of extracting video packets from a compressed video bit stream divided into video packets is illustrated in FIG. 5. Method 510 comprises providing 511 at least one relevant subset identifier, receiving 512 video packets from the compressed video bit stream, and for each 513 received video packet, inspecting 514 the subset identifier of the video packet, and extracting 516, under the condition 515 that the extracted subset identifier matches one of the at least one relevant subset identifier, the video packet from the compressed video bit stream.

Optionally, method 510 may further comprise forwarding or decoding 517 the extracted video packet, and discarding 518, under the condition 515 that the extracted subset identifier does not match any of the at least one relevant subset identifier, the received video packet.

Even further, method 510 may comprise providing 519 a subset definition describing properties of a corresponding bit stream subset of the plurality of bit stream subsets. The subset identifier associated with the corresponding bit stream is used as the at least one relevant subset identifier in step 511.

Optionally, in step 519, the subset definition may be selected from a plurality of subset definitions according to at last one property of the corresponding bit stream subset. The subset definition may be received from a video packet in the compressed video bit stream.

Even further, method 510 may comprise providing 520 a video representation definition comprising the at least one relevant subset identifier, wherein the bit stream subsets associated with the at least one relevant subset identifier form a decodable video representation. The video representation definition may be received from a video packet in the compressed video bit stream.

Figure 6:
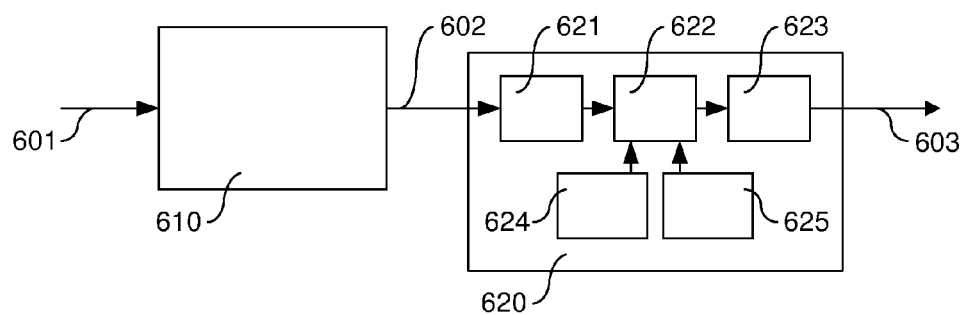
FIG. 6 shows a bit stream marker, in accordance with an embodiment of the invention.

In the following, and with reference to FIG. 6, a bit stream marker for indicating bit stream subsets in a compressed video bit stream, in accordance with an embodiment of the invention, is described. An embodiment of the bit stream marker may, e.g., be located in encoding device 110, described with reference to FIG. 1. In particular, an embodiment of the bit stream marker may be implemented in a video encoder.

Bit stream marker 620 receives a compressed video bit stream 602 from a video encoder 610, which is arranged for encoding a video source signal 601. Bit stream marker 620 subdivides bit stream 602 into video packets, each video packet containing compressed video data, e.g., a video frame, supplemental information, or, generally, an NAL unit. Then, each video packet is marked with a single subset identifier, using a syntax element stream_id in the NAL unit header, as was described hereinbefore. Bit stream marker 620 transmits the packetized and marked bit stream 603 to a transport network, such as network 120, and eventually a client or peer in a peer-to-peer network, such as decoding device 130, described with reference to FIG. 1.

To this end, bit stream marker 620 comprises a receiving unit 621 for receiving the compressed video bit stream, a packetizing unit 622 arranged for dividing the compressed video bit stream into video packets, and a marking unit 623 for marking each video packet with a single subset identifier, stream_id.

Further, bit stream marker 620 may optionally comprise a subset definition unit 624 for providing at least one subset definition. The subset definition may be provided as a video packet in the compressed video bit stream.

Even further, bit stream marker 620 may optionally comprise a video representation definition unit 625 for providing at least one video representation definition. The video representation definition may be provided as a video packet in the compressed video bit stream.

The receiving unit 621, the packetizing unit 622, the marking unit 623, the subset definition unit 624, and the video representation unit 625, may be implemented by means of circuitry, integrated circuits (ICs), application specific integrated circuits (ASICs), computer program modules running on one or more processors, or a combination thereof. Units 621-625 may be implemented as separate units or in combination.

It will be appreciated that video encoder 610 may provide a packetized video bit stream 602 to bit stream marker 620, in which case bit stream marker 620 would not have to subdivide bit stream 602 into packets. Further, the marking procedure in accordance with an embodiment of the invention, as described hereinbefore, may be performed by video encoder 610 rather than in a separate bit stream marker. Further, an existing video encoder may be arranged for performing bit stream marking in accordance with an embodiment of the invention by updating the software of the existing video encoder with an embodiment of the computer program.

Figure 7:
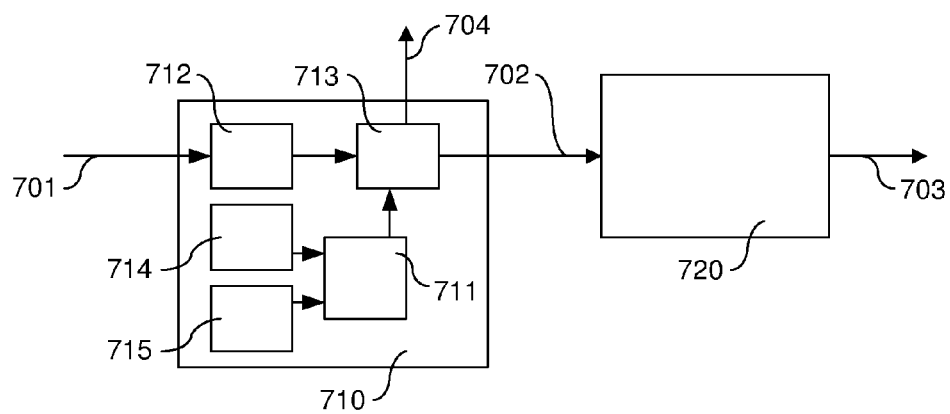
FIG. 7 shows a bit stream extractor, in accordance with an embodiment of the invention.

In the following, and with reference to FIG. 7, a bit stream extractor for extracting video packets from a compressed video bit stream is described, in accordance with an embodiment of the invention. An embodiment of the bit stream extractor may, e.g., be located in decoding device 130, or a network element 121-123, described with reference to FIG. 1. In particular, an embodiment of the bit stream extractor may be implemented in a video decoder or in a network element which is arranged for routing video packets.

Bit stream extractor 710 receives a compressed video bit stream 701, video packets, i.e., NAL units being associated with several bit stream subsets. Video bit stream 701 may, e.g., be received from a transport network, such as network 120 described with reference to FIG. 1. Bit stream extractor 710 identifies relevant NAL units comprised in bit stream 701 and extracts them for further processing.

To this end, bit stream extractor 710 comprises a subset selecting unit being 711 for providing at least one relevant subset identifier, a receiving unit 712 for receiving video packets from video bit stream 701, and an extracting unit 713 for, for each received video packet inspecting the subset identifier of the video packet, and extracting, under the condition that the extracted subset identifier matches one of the at least one relevant subset identifier, the video packet from video bit stream 701. Optionally, extracting unit 713 may further be arranged for, for each received video packet, forwarding or decoding the extracted video packet, and discarding 704 the video packet. If the video packet is forwarded it may, e.g., be transmitted 702 to a video decoder 720, which decodes the video signal and outputs the decoded video signal 703 for further processing, such as displaying to a viewer. The received video packets is discarded 704 under the condition that the extracted subset identifier does not match any of the at least one relevant subset identifier.

Optionally, bit stream extractor 710 may further comprise a subset definition unit 714 for providing a subset definition. Subset definition unit 714 may be arranged for selecting the subset definition from a plurality of subset definitions according to at last one property of the corresponding bit stream subset. Subset definition unit 714 may further be arranged for receiving the subset definition from a video packet in the compressed video bit stream.

An embodiment of the bit stream extractor, such as bit stream extractor 710, may further comprise a video representation definition unit 715 for providing a video representation definition. Video representation definition unit 715 may further be arranged for receiving the video representation definition from a video packet in the compressed video bit stream.

The subset selecting unit 711, the receiving unit 712, the extracting unit 713, the subset definition unit 714, and the video representation unit 715, may be implemented by means of circuitry, ICs, ASICs, computer program modules running on one or more processors, or a combination thereof. Units 711-715 may be implemented as separate units or in combination.

It will be appreciated that the procedure of extracting bit stream subsets, i.e., video packets, from video bit stream may be performed by video decoder 720 rather than a separate bit stream extractor. Further, an existing video decoder may be arranged for performing bit stream extraction in accordance with an embodiment of the invention by updating the software of the existing video decoder with an embodiment of the computer program.

Figure 8:
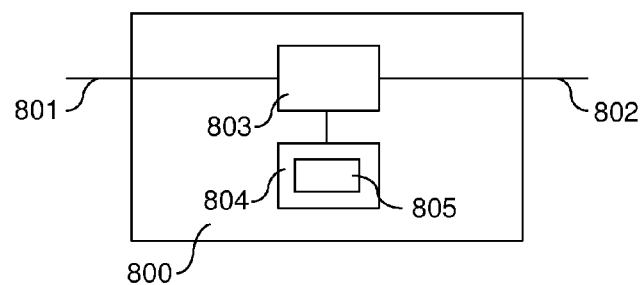
FIG. 8 shows a video processing device for executing computer program code, in accordance with embodiments of the invention.

With reference to FIG. 8, a computer program and a computer program product, in accordance with embodiments of the invention, are illustrated.

FIG. 8 shows a video processing device 800 for processing a video bit stream 801 and outputting a processed video bit stream 802. Video processing device 800 comprises a processor 803 and a storage medium 804. Storage medium 804 may be a computer program product comprising a computer program 805. Alternatively, computer program 805 may be transferred to storage medium 804 by means of a suitable computer program product, such as a floppy disk or a memory stick. As a further alternative, computer program 805 may be downloaded to storage medium 804 over a network. Processor 803 is arranged for loading computer program 805 from storage medium 804 and executing computer program code comprised in computer program 805 so as to implement an embodiment of the method in accordance with the first or the fourth aspect of the invention. For instance, processor 803 may be adapted, when executing computer program 805, to implement an embodiment of the method of indicating bit stream subsets in a compressed video bit stream. Alternatively, processor 803 may be adapted, when executing computer program 805, to implement an embodiment of the method of extracting video packets from a compressed video bit stream. Processor 803 may be a general purpose processor, a video processor, or any other type of circuitry being arranged for, when executing computer program 804, implementing an embodiment of the method in accordance with the first or the fourth aspect of the invention. Processing device 800 may, e.g., be comprised in a mobile phone, a tablet, a user equipment (UE), a personal computer, a video player/recorder, a multimedia player, a media streaming server, a set-top box, a television set, or any other type of device having computing capabilities.

Further, all embodiments of the invention described hereinbefore may be implemented in a video encoder or decoder, either in software, hardware, or a combination thereof. The encoder and/or decoder may also be implemented in a network device being, or belonging to, a network node in a communications network between a sending device and a receiving device. Such a network device may be a device for converting video according to one video coding standard to another video coding standard, for example if it has been established that the receiving device is only capable, or prefers, another video coding standard than the one sent from the sending device. Although the video encoder and/or decoder disclosed above have been disclosed physically separate devices, and may be comprised in special purpose circuits such as one or more ASICs, the invention covers embodiments of devices where some parts of the encoder and/or decoder are implemented as computer program modules running on one or more general purpose processors.

The person skilled in the art realizes that the invention by no means is limited to the embodiments described above. On the contrary, many modifications and variations are possible within the scope of the appended claims. For example, the proposed layered stream signaling concept may in principle be applied to all types of media including audio, subtitle, graphics, and so forth. Further, a client, or network element, may advantageously acquire StPSs and RPSs by means of a reliable transmission channel, whereas transmission protocols such as HTTP and RTP may be used for transmitting rest of the bit stream subsets which contain video data. Finally, it will also be appreciated that NAL unit headers may comprise further information elements, in addition to the single subset identifier, stream_id.

The invention claimed is:

1. A method of indicating bit stream subsets in a compressed layered video bit stream comprising a plurality of bit stream subsets, each bit stream subset representing a certain layer of the compressed layered video bit stream, the method comprising:
   receiving the compressed layered video bit stream;
   dividing the compressed layered video bit stream into video packets, wherein each video packet comprises either one of video data or supplemental information;
   marking each video packet with a single subset identifier of a plurality of subset identifiers, wherein each subset identifier of the plurality of subset identifiers is associated with a corresponding bit stream subset of the plurality of bit stream subsets, for associating each video packet with the corresponding bit stream subset and with parameters describing properties of the corresponding bit stream subset; and
   providing at least one video representation definition, each video representation definition comprising at least one relevant subset identifier, wherein the bit stream subsets associated with the at least one relevant subset identifier together form a decodable video representation.

2. The method according to claim 1, further comprising:
   providing at least one subset definition, each subset definition comprising the parameters describing the properties of the corresponding bit stream subset of the plurality of bit stream subsets.

3. The method according to claim 2, wherein the at least one subset definition is provided as a video packet in the compressed layered video bit stream.

4. The method according to claim 1, wherein each subset identifier of the plurality of subset identifiers is a numerical value corresponding to a relative priority of its associated bit stream subset.

5. The method according to claim 1, wherein the at least one video representation definition is provided as a video packet in the compressed layered video bit stream.

6. A non-transitory computer readable medium storing a computer program comprising computer program code that when executed on a processor configures the processor to indicate bit stream subsets in a compressed layered video bit stream comprising a plurality of bit stream subsets, each bit stream subset representing a certain layer of the layered video bit stream, based on configuring the processor to:
   divide the compressed layered video bit stream into video packets, wherein each video packet comprises either one of video data or supplemental information;
   mark each video packet with a single subset identifier of a plurality of subset identifiers, wherein each subset identifier of the plurality of subset identifiers is associated with a corresponding bit stream subset of the plurality of bit stream subsets, for associating each video packet with the corresponding bit stream subset and with parameters describing properties of the corresponding bit stream subset; and
   provide at least one video representation definition, each video representation definition comprising at least one relevant subset identifier, wherein the bit stream subsets associated with the at least one relevant subset identifier together form a decodable video representation.

7. A method of extracting video packets from a compressed layered video bit stream divided into video packets, the compressed layered video bit stream comprising a plurality of bit stream subsets, wherein each bit stream subset represents a certain layer of the compressed layered video bit stream and each video packet comprises either one of video data or supplemental information and a single subset identifier of a plurality of subset identifiers, wherein each subset identifier is associated with a corresponding bit stream subset of the plurality of bit stream subsets, for associating each video packet with the corresponding bit stream subset and with parameters describing properties of the corresponding bit stream subset, the method comprising:
   providing a video representation definition comprising at least one relevant subset identifier, wherein the bit stream subsets associated with the at least one relevant subset identifier together form a decodable video representation;
   receiving video packets from the compressed layered video bit stream; and
   for each received video packet:
   inspecting the subset identifier of the video packet, and
   extracting, under the condition that the extracted subset identifier matches one of the at least one relevant subset identifier, the video packet from the compressed layered video bit stream.

8. The method according to claim 7, further comprising, for each received video packet:
   forwarding or decoding the extracted video packet, and
   discarding, under the condition that the extracted subset identifier does not match any of the at least one relevant subset identifier, the received video packet.

9. The method according to claim 7, further comprising:
   providing a subset definition comprising parameters describing the properties of the corresponding bit stream subset of the plurality of bit stream subsets, and
   using the subset identifier associated with the corresponding bit stream as the at least one relevant subset identifier.

10. The method according to claim 9, further comprising:
    selecting the subset definition from a plurality of subset definitions according to at least one property of the corresponding bit stream subset.

11. The method according to claim 9, further comprising:
    receiving the subset definition from a video packet in the compressed layered video bit stream.

12. The method according to claim 7, further comprising:
    receiving the video representation definition from a video packet in the compressed layered video bit stream.

13. The method according to claim 7, wherein each subset identifier of the plurality of subset identifiers is a numerical value corresponding to a relative priority of its associated bit stream subset.

14. A non-transitory computer readable medium storing a computer program comprising computer program code that when executed on a processor configures the processor to extract video packets from a compressed layered video bit stream divided into video packets, the compressed layered video bit stream comprising a plurality of bit stream subsets, wherein each bit stream subset represents a certain layer of the compressed layered video bit stream and each video packet comprises either one of video data or supplemental information and a single subset identifier of a plurality of subset identifiers, wherein each subset identifier is associated with a corresponding bit stream subset of the plurality of bit stream subsets, for associating each video packet with the corresponding bit stream subset and with parameters describing properties of the corresponding bit stream subset, based on configuring the processor to:
provide a video representation definition comprising at least one relevant subset identifier, wherein the bit stream subsets associated with the at least one relevant subset identifier together form a decodable video representation;
receive video packets from the compressed layered video bit stream; and
for each received video packet:
inspect the subset identifier of the video packet, and
extract, under the condition that the extracted subset identifier matches one of the at least one relevant subset identifier, the video packet from the compressed layered video bit stream.

15. A bit stream marker for indicating bit stream subsets in a compressed layered video bit stream comprising a plurality of bit stream subsets, each bit stream subset representing a certain layer of the compressed layered video bit stream, the bit stream marker comprising a processor and associated storage medium that implement:
a receiving unit being arranged for receiving the compressed layered video bit stream;
a packetizing unit being arranged for dividing the compressed layered video bit stream into video packets, wherein each video packet comprises either one of video data or supplemental information;
a marking unit being arranged for marking each video packet with a single subset identifier of a plurality of subset identifiers, wherein each subset identifier is associated with a corresponding bit stream subset of the plurality of bit stream subsets, for associating each video packet with the corresponding bit stream subset and with parameters describing properties of the corresponding bit stream subset; and
a video representation definition unit being arranged for providing at least one video representation definition, each video representation definition comprising at least one relevant subset identifier, wherein the bit stream subsets associated with the at least one relevant subset identifier together form a decodable video representation.

16. The bit stream marker according to claim 15, further comprising:
a subset definition unit being arranged for providing at least one subset definition, each subset definition comprising the parameters describing the properties of the corresponding bit stream subset of the plurality of bit stream subsets.

17. The bit stream marker according to claim 16, wherein the at least one subset definition is provided as a video packet in the compressed layered video bit stream.

18. The bit stream marker according to claim 15, wherein each subset identifier of the plurality of subset identifiers is a numerical value corresponding to a relative priority of its associated bit stream subset.

19. The bit stream marker according to claim 15, wherein the at least one video representation definition is provided as a video packet in the compressed layered video bit stream.

20. A bit stream extractor for extracting video packets from a compressed layered video bit stream divided into video packets, the compressed layered video bit stream comprising a plurality of bit stream subsets, wherein each bit stream subset represents a certain layer of the compressed layered video bit stream and each video packet comprises either one of video data or supplemental information and a single subset identifier of a plurality of subset identifiers, wherein each subset identifier is associated with a corresponding bit stream subset of the plurality of bit stream subsets, for associating each video packet with the corresponding bit stream subset and with parameters describing properties of the corresponding bit stream subset, the bit stream extractor comprising a processor and associated storage medium that implement:
a video representation definition unit being arranged for providing a video representation definition comprising at least one relevant subset identifier, wherein the bit stream subsets associated with the at least one relevant subset identifier together form a decodable video representation;
a receiving unit being arranged for receiving video packets from the compressed layered video bit stream; and
an extracting unit being arranged for, for each received video packet:
inspecting the subset identifier of the video packet, and
extracting, under the condition that the extracted subset identifier matches one of the at least one relevant subset identifier, the video packet from the compressed layered video bit stream.

21. The bit stream extractor according to claim 20, the extracting unit being further arranged for, for each received video packet:
forwarding or decoding the extracted video packet, and
discarding, under the condition that the extracted subset identifier does not match any of the at least one relevant subset identifier, the received video packet.

22. The bit stream extractor according to claim 20, further comprising:
a subset definition unit being arranged for providing a subset definition comprising parameters describing the properties of the corresponding bit stream subset of the plurality of bit stream subsets,
wherein the subset selecting unit is further arranged for using the subset identifier associated with the corresponding bit stream as the at least one relevant subset identifier.

23. The bit stream extractor according to claim 22, wherein the subset definition unit is further arranged for:
selecting the subset definition from a plurality of subset definitions according to at least one property of the corresponding bit stream subset.

24. The bit stream extractor according to claim 22, wherein the subset definition is received from a video packet in the compressed layered video bit stream.

25. The bit stream extractor according to claim 20, wherein the video representation definition unit is further arranged for:

receiving the video representation definition from a video packet in the compressed layered video bit stream.

26. The bit stream extractor according to claim 20, wherein each subset identifier of the plurality of subset identifiers is a numerical value corresponding to a relative priority of its associated bit stream subset.

\* \* \* \* \*